United States Patent
Fischer et al.

(10) Patent No.: US 6,711,809 B1
(45) Date of Patent: Mar. 30, 2004

(54) PNEUMATIC AND MANUAL INSTALLATION TOOLS FOR INSTALLING U-NUT FASTENERS

(75) Inventors: John D. Fischer, Whitmore Lake, MI (US); Lawrence W. Johnson, Taylor, MI (US); James W. Robinson, Mundelein, IL (US)

(73) Assignee: Illinois Tool Works Inc., Glenview, IL (US)

( * ) Notice: Subject to any disclaimer, the term of this patent is extended or adjusted under 35 U.S.C. 154(b) by 10 days.

(21) Appl. No.: 09/584,544

(22) Filed: May 31, 2000

(51) Int. Cl.$^7$ ................................................ B23Q 7/10
(52) U.S. Cl. ........................ 29/813; 29/809; 29/811.2
(58) Field of Search ...................... 29/813, 809, 811.2, 29/525, 525.01; 411/174, 175, 522, 111; 229/120; 221/312 R

(56) References Cited

U.S. PATENT DOCUMENTS

| | | | |
|---|---|---|---|
| 2,315,209 A | | 3/1943 | Kost |
| 2,886,815 A | * | 5/1959 | Young |
| 3,613,878 A | | 10/1971 | Langas et al. |
| 3,672,029 A | | 6/1972 | Butriss |
| 4,485,952 A | | 12/1984 | Weis |
| 4,684,305 A | | 8/1987 | Dubost |
| 4,729,706 A | | 3/1988 | Peterson et al. |
| 4,793,753 A | | 12/1988 | Muller et al. |
| 4,798,507 A | | 1/1989 | Olah |
| 4,878,794 A | | 11/1989 | Potucek |
| 5,039,264 A | | 8/1991 | Benn |
| 5,294,224 A | | 3/1994 | Kent |
| 5,713,707 A | | 2/1998 | Gagnon |

FOREIGN PATENT DOCUMENTS

| | | |
|---|---|---|
| DE | 196 16 475 C1 | 4/1996 |
| JP | 11239931 | 7/1999 |

OTHER PUBLICATIONS

"The Clipper", Pneumatic J–Nut Insertion Tool, Monroe & Everhard, Inc., Lexington, Kentucky.

* cited by examiner

Primary Examiner—John C. Hong
(74) Attorney, Agent, or Firm—Mark W. Croll; Paul F. Donovan

(57) ABSTRACT

A U-nut type fastener installation tool, for installing individual U-nut fasteners from a vertically stacked, nested, or collated strip or array of such fasteners disposed within a magazine portion of the tool. The vertically nested, stacked, or collated strip is biased toward the dispensing station or position by means of a spring member, and a wedge-shaped member is adapted to be driven between an endmost one of the nested, stacked, or collated fasteners and the remaining fasteners disposed within the nested, stacked, or collated array of fasteners so as to separate the endmost one of the fasteners from the remaining fasteners of the nested, stacked or collated array of fasteners and drive such endmost fastener onto the edge portion of the support plate or panel. In accordance with further teachings and principles of the present invention, the wedge shaped, fastener separator-driver member may be either pneumatically driven or manually driven whereby the installation tool may comprise either a pneumatically-operable tool or a manually-operable tool.

30 Claims, 12 Drawing Sheets

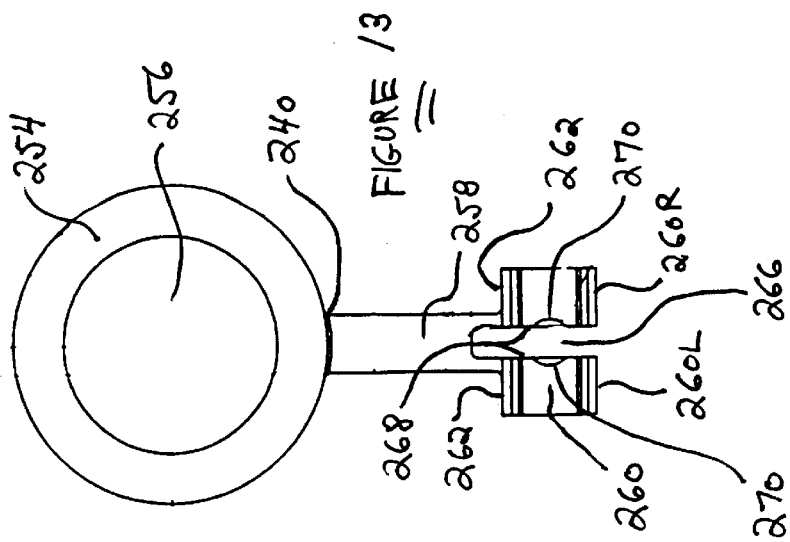
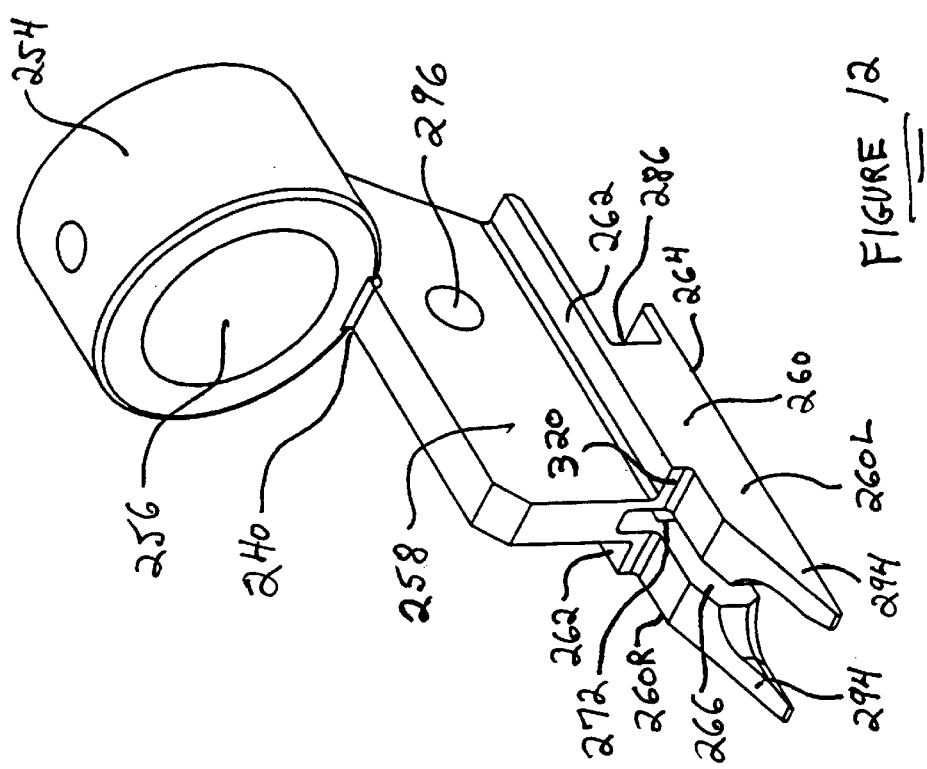

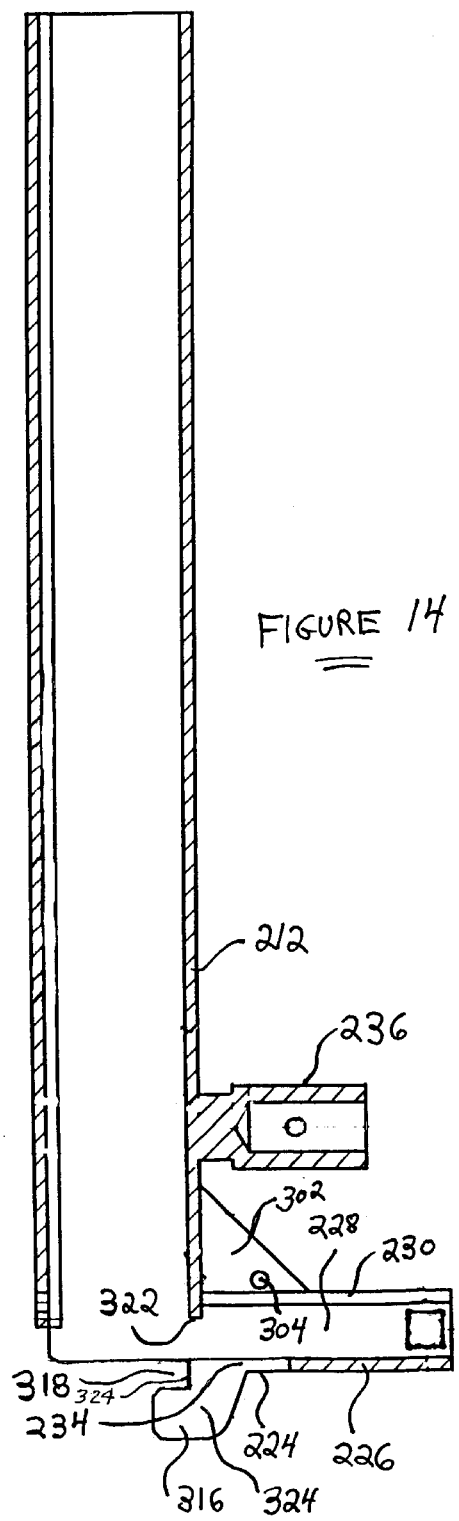
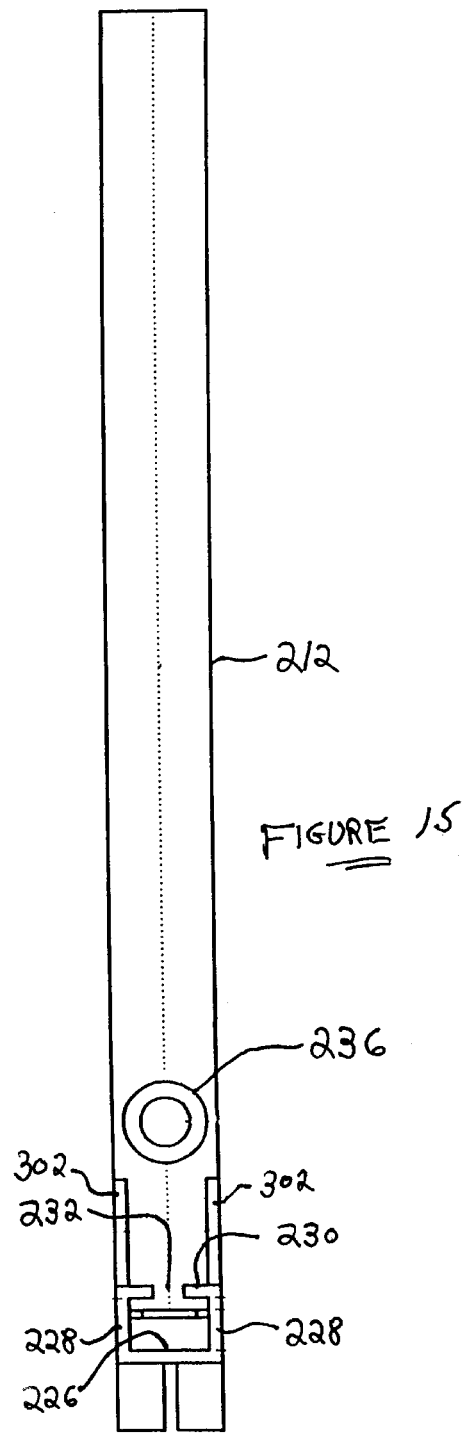
FIGURE 14
FIGURE 15

PNEUMATIC AND MANUAL INSTALLATION TOOLS FOR INSTALLING U-NUT FASTENERS

FIELD OF THE INVENTION

The present invention relates generally to tools, and more particularly to new and improved pneumatic and manual installation tools for installing U-nut type fasteners upon edge portions of panels, plates, or the like, wherein each one of the installation tools is uniquely structured so as to permit a nested, stacked, or collated strip of U-nut fasteners to be accommodated within a magazine of the installation tool, and wherein further, the installation tool is able to separate individual fasteners from the vertical stack or collated strip of U-nut fasteners so as to serially apply the fasteners to edge portions of the mounting plates, panels, or the like.

BACKGROUND OF THE INVENTION

U-nuts are widely used as fasteners or support brackets within the automotive and other industries for mounting various components, such as, for example, modules, door panels, hinges, and the like, upon support panels, plates, beams, and the like. U-nut type fasteners conventionally comprise a U-shaped spring clip which has a flexibly resilient annular hoop or retainer ring, having a central aperture, partially sheared from a first one of the arms of the U-shaped spring clip, and an internally threaded sleeve or nut member which is integrally formed upon a second one of the arms of the U-shaped spring clip for threadedly receiving a threaded bolt or similar type fastener which is also passed through an aperture defined within the support plate or panel whereby the U-nut and bolt fasteners can be fixedly secured upon the support plate or panel so as to in turn secure one of the aforenoted components upon the support plate or panel. The second one of the arms of the U-shaped spring clip is also preferably provided with an upwardly bent forward edge or lip portion so as to facilitate insertion of an edge portion of the support panel or plate between the two arms of the U-nut.

U-nuts are thus mounted upon a support panel or plate by inserting, in effect, an edge portion of the support panel or plate into the space defined between the two arms of the U-nut fastener and subsequently sliding the U-nut fastener onto the support panel or plate until the flexibly resilient annular hoop or retainer ring engages and becomes seated within the aperture defined within the support panel or plate. The central aperture formed within the first one of the arms of the U-nut, and serving to define the annular hoop or retainer ring, also permits the passage therethrough of the bolt fastener, and still further, serves to somewhat guide the bolt fastener into engagement with the internally threaded sleeve or nut member formed upon the second one of the arms of the U-nut. Various types or various configurations of U-nut type fasteners are disclosed within U.S. Pat. No. 5,713,707 which issued to Gagnon on Feb. 3, 1998, U.S. Pat. No. 5,294,224 which issued to Kent on Mar. 15, 1994, U.S. Pat. No. 5,039,264 which issued to Benn on Aug. 13, 1991, U.S. Pat. No. 4,798,507 which issued to Olah on Jan. 17, 1989, U.S. Pat. No. 4,793,753 which issued to Muller et al. on Dec. 27, 1988, U.S. Pat. No. 4,729,706 which issued to Peterson et al. on Mar. 8, 1988, U.S. Pat. No. 4,684,305 which issued to Dubost on Aug. 4, 1987, and U.S. Pat. No. 3,426,818 which issued to Derby on Feb. 1, 1969. An installation tool for installing an individual U-nut type fastener upon a plate or panel is also disclosed within U.S. Pat. No. 4,793,753 which issued to Muller et al. on Dec. 27, 1988.

In connection with the sale and distribution of U-nut fasteners, the same are normally placed in storage bins in preparation for conveyance to packaging machinery, however, as can readily be appreciated, due to the unique structure of U-nut fasteners, the conventional storage of such fasteners usually results in the interlocking or entanglement of such fasteners. Such interlocking or entanglement of the fasteners prevents the efficient packaging of the fasteners, and in addition, inhibits the efficient and rapid use of such fasteners during installation procedures because, obviously, the interlocked or entangled fasteners must first be unlocked or disentangled from each other prior to use and installation of the same.

A need has therefore existed in the art for a new and improved U-nut type fastener which permits and facilitates the stacking or nesting of such fasteners into a collated strip whereby the fasteners can be packaged in a substantially improved and efficient manner, and for a new and improved collated strip of such fasteners wherein the fasteners can be readily disposed or oriented for disposition within the magazine of an installation tool such that the tool can apply the fasteners to edge portions of support plates or panels. The foregoing needs have now been met by means of a new and improved U-nut type fastener, and a vertically stacked or nested array of such fasteners, as disclosed within co-pending United States Patent application entitled U-NUT FASTENER AND COLLATED STRIP OF U-NUT FASTENERS, application Ser. No. 09/583,704, filed on Mar. 31, 2000. Nevertheless, as can be appreciated from the aforenoted patent to Muller et al., there has never been provided an installation tool which can accommodate a stacked, nested, or collated strip of U-nut type fasteners within, for example, a magazine portion of the tool, and which can then in effect separate individual fasteners from the nested, stacked, or collated array of fasteners so as to serially dispense such fasteners and therefore mount the same upon edge portions of support plates or panels.

A need therefore still exists in the art for an installation tool which can accommodate a stacked, nested, or collated strip of U-nut type fasteners within a magazine portion thereof, which is additionally able to easily remove or separate an individual one of the fasteners from the collated or nested strip of fasteners, and which is able to be utilized by operator personnel to rapidly install such separated U-nut type fasteners upon edge portions of support plates, panels, or the like.

OBJECTS OF THE INVENTION

Accordingly, it is an object of the present invention to provide a new and improved tool for installing U-nut type fasteners upon edge portions of support plates or panels.

Another object of the present invention is to provide a new and improved tool for installing U-nut type fasteners which effectively overcomes the various drawbacks or disadvantages characteristic of PRIOR ART U-nut type fastener installation tools.

An additional object of the present invention is to provide a new and improved tool for installing U-nut type fasteners wherein the tool can house a nested, stacked, or collated array of U-nut type fasteners within the tool magazine.

A further object of the present invention is to provide a new and improved installation tool which is uniquely structured for removing or separating individual U-nut fasteners from the nested or collated strip of fasteners and for installing the separated U-nut fastener upon an edge portion of a support plate or panel.

SUMMARY OF THE INVENTION

The foregoing and other objectives are achieved in accordance with the teachings and principles of the present invention through the provision of a new and improved tool for installing U-nut type fasteners wherein a vertically nested, stacked, or collated array of such fasteners is housed within a magazine portion of the tool. The vertically nested, stacked, or collated strip is biased toward the dispensing station or position by means of a spring member, and a wedge-shaped member is adapted to be driven between an endmost one of the nested, stacked, or collated fasteners and the remaining fasteners disposed within the nested, stacked, or collated array of fasteners so as to separate the endmost one of the fasteners from the remaining fasteners of the nested, stacked or collated array of fasteners and drive such endmost fastener onto the edge portion of the support plate or panel. In accordance with further teachings and principles of the present invention, the wedge shaped, fastener separator-driver member may be either pneumatically driven or manually driven whereby the installation tool may comprise either a pneumatically-operable tool or a manually-operable tool.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 12 is a perspective view of the separator component of the fastener installation tool as shown in FIG. 11;

FIG. 13 is a right end elevational view of the separator component as shown in FIGS. 11 and 12;

FIG. 14 is a cross-sectional view of the magazine and structural base component of the new and improved installation tool as shown in FIG. 9;

FIG. 15 is a right end elevational view of the magazine and structural base component of the new and improved installation tool as shown in FIG. 14;

DETAILED DESCRIPTION OF THE PREFERRED EMBODIMENT

Figure 1:
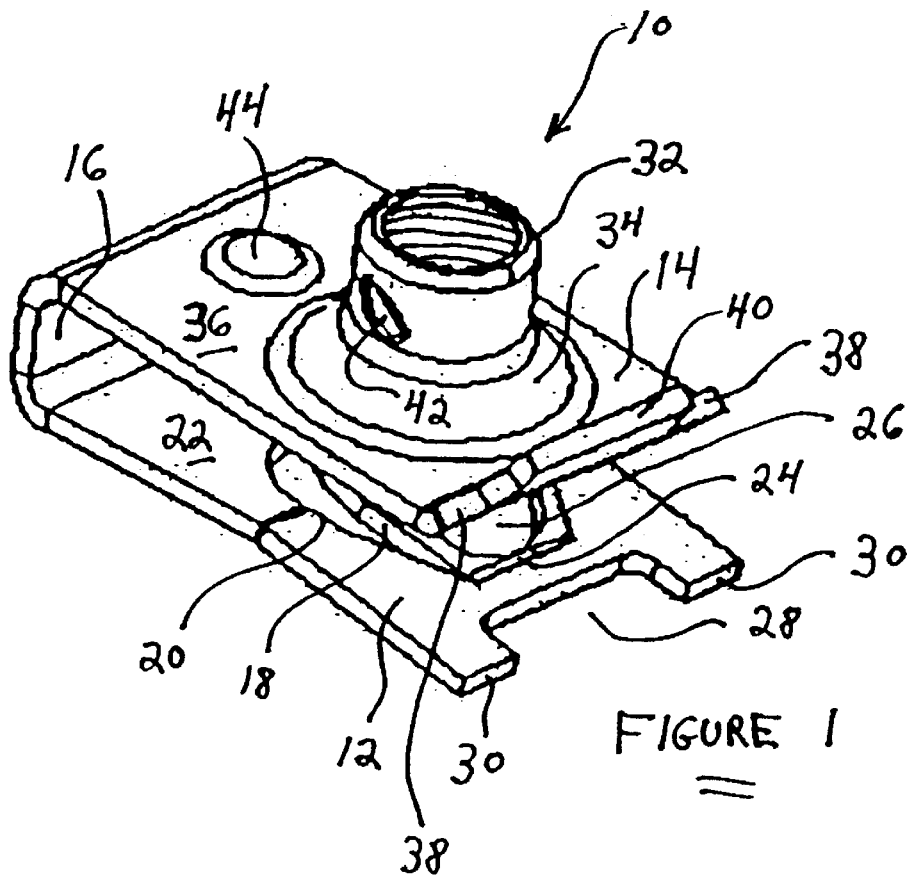
FIG. 1 is a perspective view of a U-nut type fastener which is of the type which is able to be nested, stacked, or collated together with other U-nut type fasteners having the same structure so as to form a nested, stacked, or collated strip of U-nut fasteners which is able to be incorporated within the magazine of the new and improved installation tool constructed in accordance with the teachings and principles of the present invention for dispensing and mounting such U-nut fasteners upon edge portions of a support plate or panel.

Referring now to the drawings, and more particularly to FIG. 1 thereof, a U-nut type fastener of the type which is adapted to be dispensed and mounted upon an edge portion of a support plate or panel, by means of the new and improved installation tool constructed in accordance with the principles and teachings of the present invention and as will be disclosed and discussed more in detail hereinafter, is disclosed and is generally indicated by the reference character 10. As is apparent, the U-nut fastener 10 is seen to comprise a first lower arm member 12, a second upper arm member 14, and an intermediate folded bite portion 16 integrally interconnecting the first and second arm members 12, 14 such that the overall fastener 10 has a substantially U-shaped configuration with the first and second lower and upper arms 12,14 disposed substantially parallel to each other.

The fastener 10 can be fabricated by means of suitable extrusion or stamping operations from a sheet metal blank, and it is further seen that the first lower arm member 12 has integrally formed therewith an annular hoop member or retainer ring 18 which is partially severed as at 20 from a main or primary arm portion 22 of first lower arm member 12 such that the annular hoop member or retainer ring 18 is flexibly and integrally connected to the main or primary arm portion 22 of first lower arm member 12 by means of a hinge portion 24. The annular hoop member or retainer ring 18 has a central aperture 26 defined therein, and is normally disposed in an inclined mode at a predetermined angle with respect to the main or primary arm portion 22 for engaging an aperture defined within an edge portion of a support plate or panel when the U-nut fastener 10 is mounted upon an edge portion of the support plate or panel. Lastly, the first lower arm member 12 is also provided with a recessed cut-out region 28 which is defined within the free end or forward edge portion 30 so as to assist the proper or desired stacking or nesting of a plurality of the U-nut fasteners when forming a vertical array of the U-nut fasteners for packaging and use within the installation tool of the present invention.

The second upper arm member 14 is provided with an internally threaded, upwardly projecting sleeve or nut member 32 which is substantially axially aligned with the aperture 26 defined within the annular hoop member or retainer ring 18 so as to accommodate a threaded bolt fastener, not shown, which is adapted to be passed through an aperture defined within the support plate or panel upon which the U-nut fastener 10 and the component, also not shown, are to be mounted. A frusto-conical portion 34 integrally connects the lower end portion of the sleeve or nut member 32 to an upper surface region of a main or primary arm portion 36 of second upper arm member 14 so as to properly distribute the threaded load onto the support plate or panel, not shown. The second upper arm member 14 is also provided at its free end or forward edge portion 38 with an upwardly inclined latch projection 40 which is adapted to mate with the recessed cutout portion 28 of the first lower arm member 12 when a plurality of U-nut fasteners 10 are nested or collated together in a vertically stacked array for packaging purposes as well as for magazine loading within the installation tool of the present invention.

Figure 2:
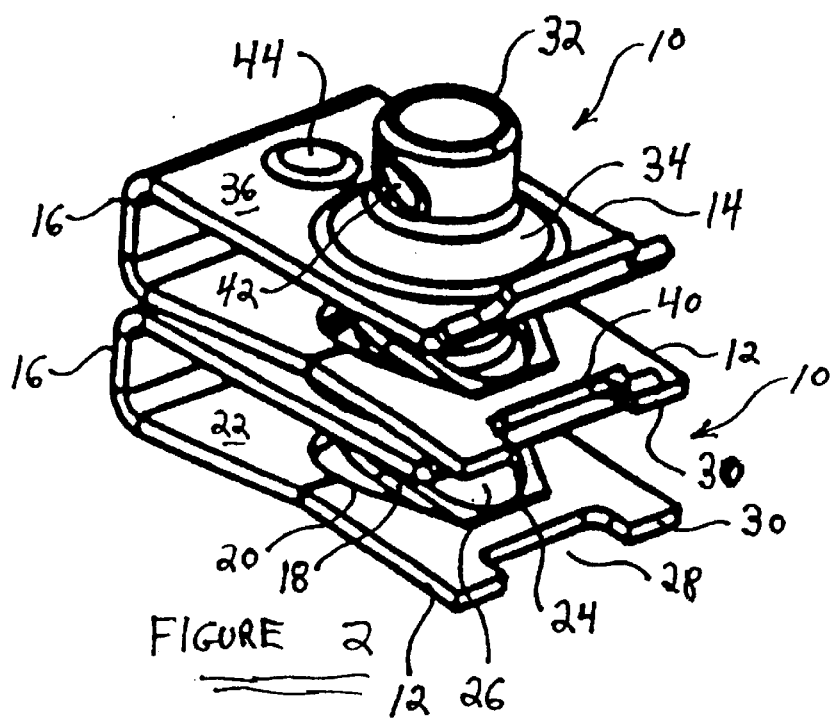
FIG. 2 is a perspective view of a pair of U-nut type fasteners, as disclosed within FIG. 1, wherein the pair of U-nut type fasteners are disclosed in a vertically stacked or nested array which is particularly adaptable for use within the magazine of the new and improved installation tool constructed in accordance with the teachings and principles of the present invention for applying individual ones of the U-nut fasteners to edge portions of support plates or panels.

With reference now being made to FIG. 2, a pair of U-nut fasteners 10,10 are shown in their relative positions when nested or stacked together in a vertical array so as to disclose the various structural features characteristic of the U-nut fastener 10 and to additionally illustrate how such structural features of the U-nut fasteners 10 enable the U-nut fasteners 10 to be stacked or nested in a vertical array so as to form a stacked or nested array of U-nut fasteners 10 for advantageous packaging of the fasteners as well as magazine loading of the same within the installation tool of the present invention. In order to form the stacked array of U-nut fasteners as disclosed within FIG. 2, it is to be appreciated that the internal diametrical extent of the annular hoop member or retainer ring 18 is substantially the same as the external diametrical extent of the upstanding sleeve or nut member 32. The annular hoop member or retainer ring 18, however, is somewhat resiliently flexible, and consequently, when a first upper one of the U-nut fasteners 10 is disposed atop a second lower one of the U-nut fasteners 10 so as to form the vertically stacked or nested array of the U-nut fasteners 10,10, the annular hoop member or retainer ring 18 of the first upper one of the U-nut fasteners 10,10 flexes or expands radially outwardly somewhat so as to accommodate the upstanding sleeve or nut member 32 of the second lower one of the U-nut fasteners 10,10 whereby the U-nut fasteners 10,10 are effectively locked together.

In order to in fact ensure or enhance such locking together of the stacked or nested U-nut fasteners 10,10, it is further seen that each one of the upstanding sleeve or nut member 32 of each one of the U-nut fasteners 10,10 is provided with a pair of detents or indentations 42 upon diametrically opposite sides of the upstanding sleeve or nut member 32. It is noted that each detent or indentation 42 has a substantially elliptical or oval-shaped configuration and that the major axis of the elliptical or oval-shaped detent or indentation 42 is inclined with respect to the horizontal whereby such major axis is disposed at an angular inclination which substantially matches the inclination of the annular hoop member or retainer ring 18. In this manner, the plane of the annular hoop member or retainer ring 18 is in effect aligned with the major axis of the detent or indentation 42 whereupon the side portions of the annular hoop member or retainer ring 18 will be properly seated within or engaged with the detents or indentations 42.

When the pair of U-nut fasteners 10,10 are disposed in the illustrated vertically stacked or nested array, it is further noted that the upwardly inclined latch projection 40 of the lower one of the U-nut fasteners 10,10 is engaged within the recessed or cut-out edge portion 28 of the upper one of the U-nut fasteners 10 while the forwardly projecting edge portions 30,30 of the upper one of the U-nut fasteners rest upon or engage the forward edge portions 38,38 of the lower one of the U-nut fasteners 10. This engagement or disposition of such structure serves two purposes. The interengagement of the latch projection 40 of the lower U-nut fastener 10 with the recessed or cut-out portion 28 of the upper U-nut fastener 10 prevents relative pivotal or rotational movement of the fasteners 10,10 with respect to each other whereby the fasteners 10,10 will in effect remain in their vertically aligned stacked array. In addition, the interengagement of the forward edge portions 30,30 of the upper one of the U-nut fasteners 10 with the forward edge portions 38,38 of the lower one of the U-nut fasteners 10 serves to maintain the fasteners 10,10 in a substantially horizontally parallel mode.

As a further and last feature of the U-nut fastener of the type with which the installation tool of the present invention is concerned, and in conjunction with the aforenoted structure for maintaining the stacked or nested fasteners 10,10 in a substantially parallel disposition or orientation, it is also seen that a dimple 44 is provided upon a rearwardly disposed upper surface portion of the upper arm member 14. As can be appreciated, when the fasteners 10,10 are nested or stacked, the dimple 44 of a lower one of the fasteners 10 engages an undersurface portion of the lower arm member 12 of an upper one of the fasteners 10 such that the rear end portions of the stacked or nested U-nut fasteners 10,10 are maintained in a spaced relationship with respect to each other whereby the aforenoted desired parallel mode or orientation of the fasteners 10,10 is achieved. It is noted still further that such spacing between such rear portions of the stacked or nested fasteners 10,10 also serves to permit a component of an installation tool to be inserted within such space so as to in effect separate, for example, the lowermost one of the fasteners 10 from the vertical stack or array of fasteners 10 disposed, for example, within a magazine of the installation tool, whereby individual fasteners 10 can be applied to edge portions of a support plate or panel as will be discussed shortly hereinafter. It is also noted that when a particular fastener 10 is slidably mounted upon an edge portion of the support panel or plate which, as has been noted hereinbefore, is provided with an aperture for permitting a bolt fastener, not shown, to be inserted therethrough, the flexibly resilient annular hoop member or retainer ring 18 will be snap-fitted into such support plate or panel aperture so as to properly seat the fastener 10 upon the support plate or panel.

Figure 3:
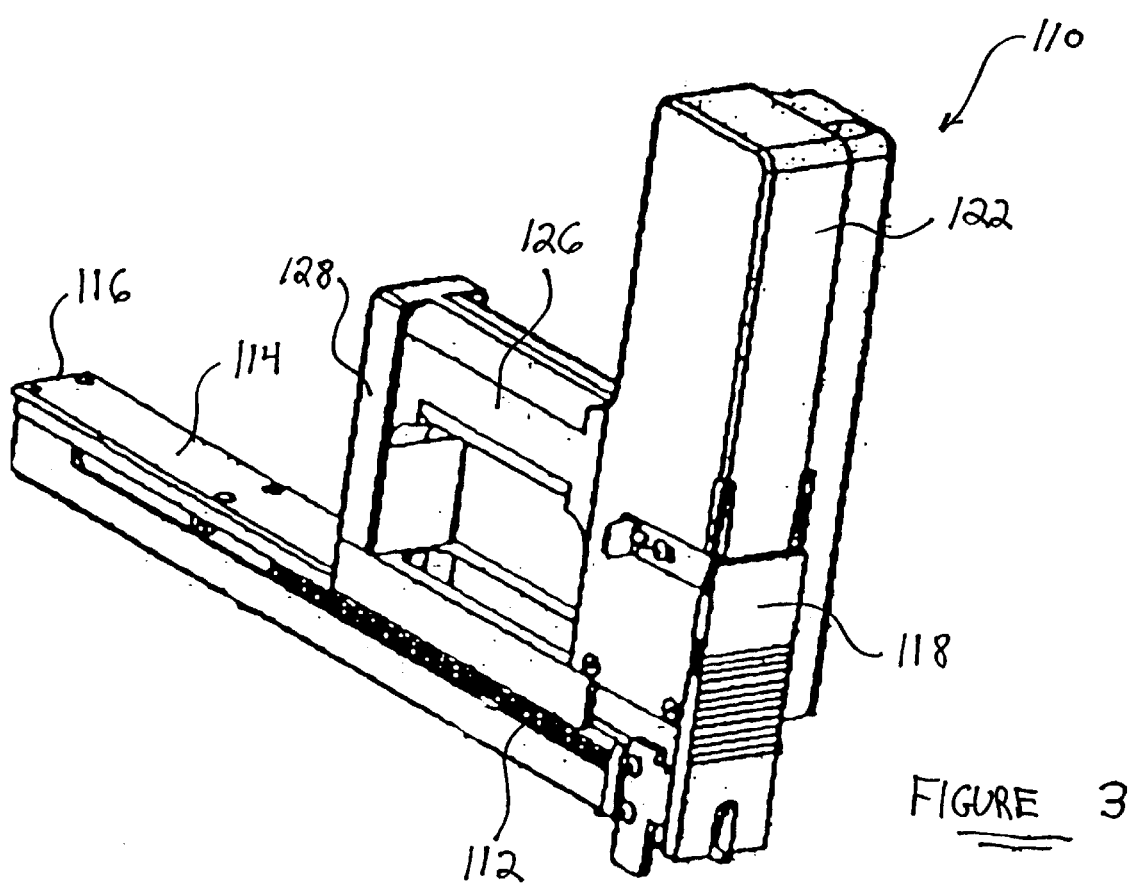
FIG. 3 is a perspective view of a new and improved pneumatically-operable U-nut type fastener installation tool constructed in accordance with the principles and teachings of the present invention and showing the cooperative parts thereof.
Figure 4:
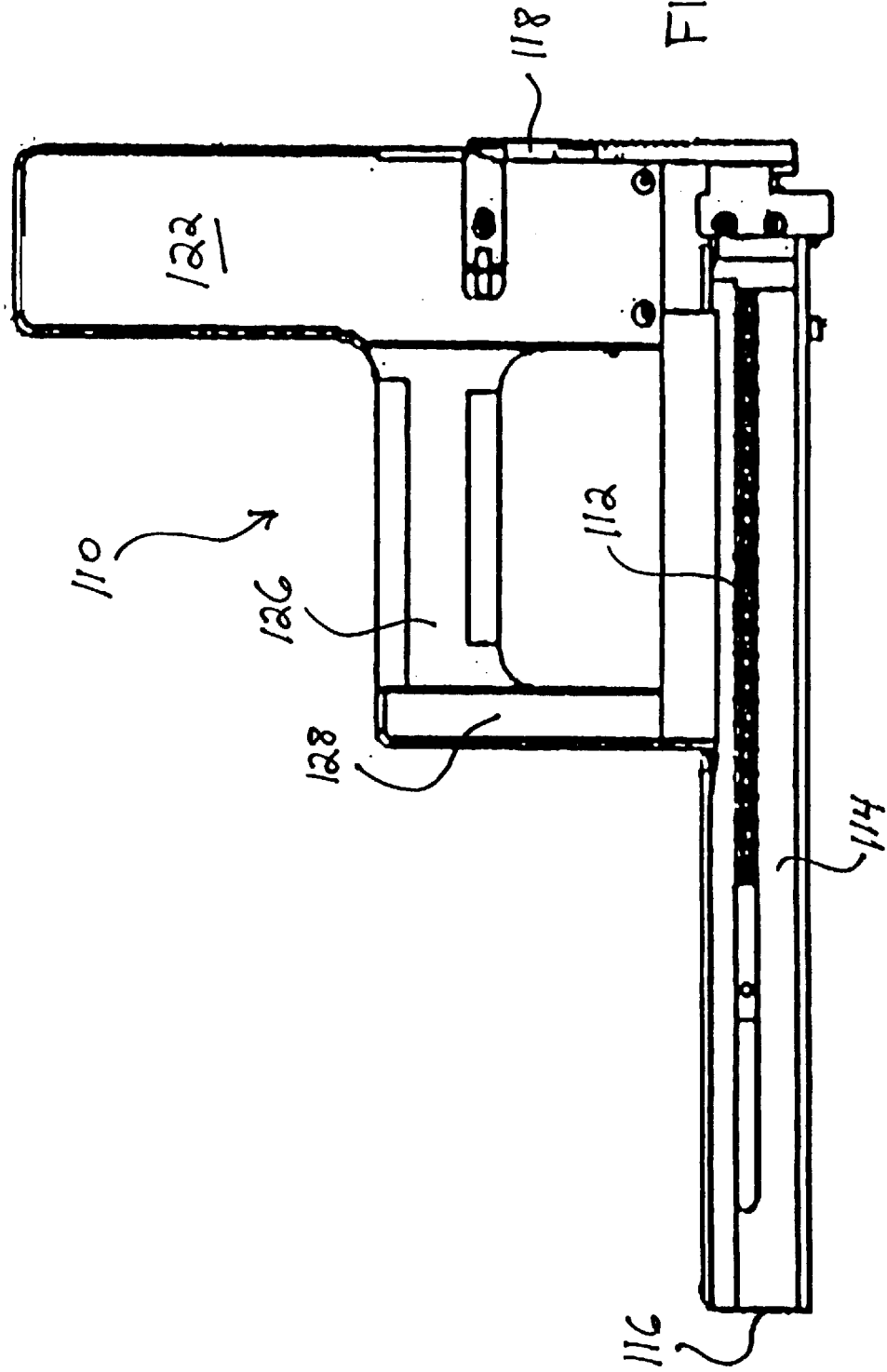
FIG. 4 is a side elevational view of the new and improved pneumatically-operable U-nut type fastener installation tool shown in FIG. 3.

With reference now being made to FIGS. 3 and 4, a first embodiment of an installation tool, constructed in accordance with the principles and teachings of the present invention, is disclosed and is generally indicated by the reference character 110. As has been alluded to hereinbefore, the installation tool 110 is adapted to house a stacked, nested, or collated strip of the U-nut fasteners 10,10 as shown in FIG. 2, and as now shown in FIGS. 3 and 4, it is of course seen that the nested, stacked, or collated strip 112 of U-nut fasteners 10 obviously comprises more than just two of the fasteners 10,10 as shown in FIG. 2 which simply disclosed two of the fasteners 10,10 for illustrative purposes in order to show or illustrate the interengaging structural details of the fasteners 10 when the same are stacked, nested, or collated atop one another.

Figure 8:
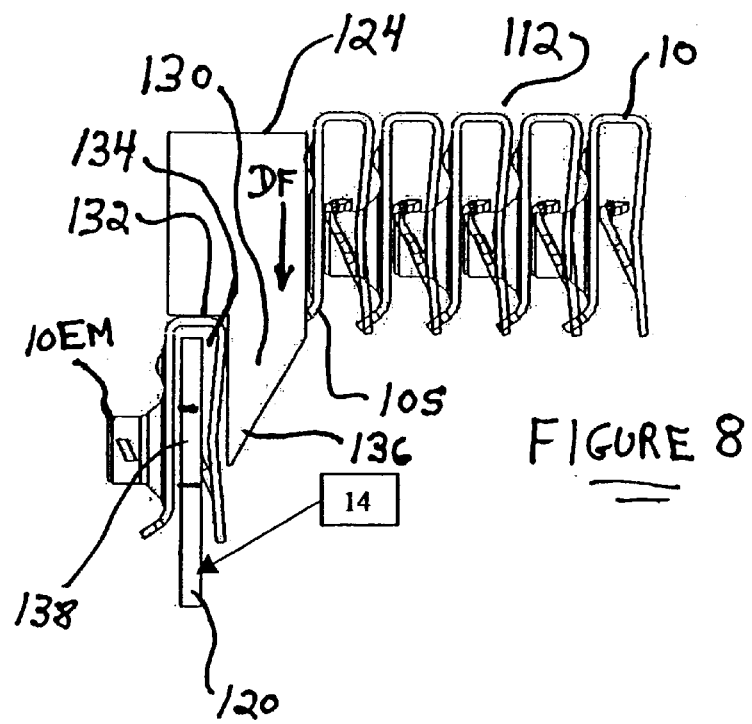

In view of the fact that each one of the U-nut fasteners 10 has an overall configuration which is substantially rectangular, the installation tool 110 comprises, as viewed in FIGS. 3 and 4, a horizontally disposed magazine 114 which also has a substantially rectangular configuration and within which the horizontally disposed stacked, nested, or collated strip 112 of U-nut fasteners 10 is disposed. The left end of the magazine 114 is closed by means of a suitable end wall 116, while the right end of the magazine 114 is closed by means of a vertically movable door 118. The door 118 is adapted to be biased downwardly toward its closed position by means of a suitable spring mechanism, not shown, and a coil spring member, also not shown, is disposed within the left end portion of the magazine 114 so as to be interposed between an interior surface of the end wall 116 and the left end of the collated strip 112 of fasteners 10. In this manner, the collated strip 112 of fasteners 10 is biased toward the right end of the magazine 114 whereby the endmost one of the fasteners 10 disposed within the collated strip of fasteners 112 is disposed in contact with an interior surface of the door 118 and is therefore disposed at a position at which the U-nut fasteners 10 can be individually dispensed and mounted or installed upon an edge portion of a support plate or panel 120 as shown in FIG. 8 and as will be discussed more fully hereinafter.

With reference still being made to FIGS. 3 and 4, the tool 110 further comprises a vertically disposed pneumatic drive assembly 122 within which there is disposed a pneumatically driven member or component 124 which is schematically shown in FIGS. 5–8. The pneumatic assembly 122 is seen to be disposed above the right end portion of the magazine 114, and accordingly, as will be more fully discussed and appreciated hereinafter, the pneumatically driven member or component 124 is adapted to be driven vertically downwardly so as to engage the endmost one of the fasteners 10 which is disposed at the aforenoted dispensing position within the fastener magazine 114. A horizontally disposed operator's handle 126 is disposed above the magazine 114 and is integrally connected at its left end portion to the magazine 114 by means of an upstanding support frame member 128, while the right end portion of the handle 126 is integrally connected to the upstanding pneumatic drive assembly 122.

With reference now being made to FIGS. 5–8, the use of the new and improved installation tool 110 constructed in accordance with the principles and teachings of the present invention will now be discussed in connection with the installation of a U-nut fastener 10 upon an edge portion of a support plate or panel 120. As shown in FIGS. 5–8, a plurality of U-nut type fasteners 10 are disposed within the stacked, nested, or collated strip 112 of fasteners 10 which is adapted to be disposed within the tool magazine 114. As has been previously disclosed and discussed, the pneumatic drive assembly 122 comprises the pneumatically driven member or component 124, and now, as best seen or appreciated from FIGS. 5–8, the pneumatically driven member or component 124 is seen to comprise a dependent or downwardly extending or projecting wedge-shaped portion 130 and upwardly recessed or stepped portion 132 which defines, in effect, a socket 134 within which a separated one of the U-nut fasteners 10 is adapted to be disposed as will be more fully appreciated hereinafter.

Figure 5:
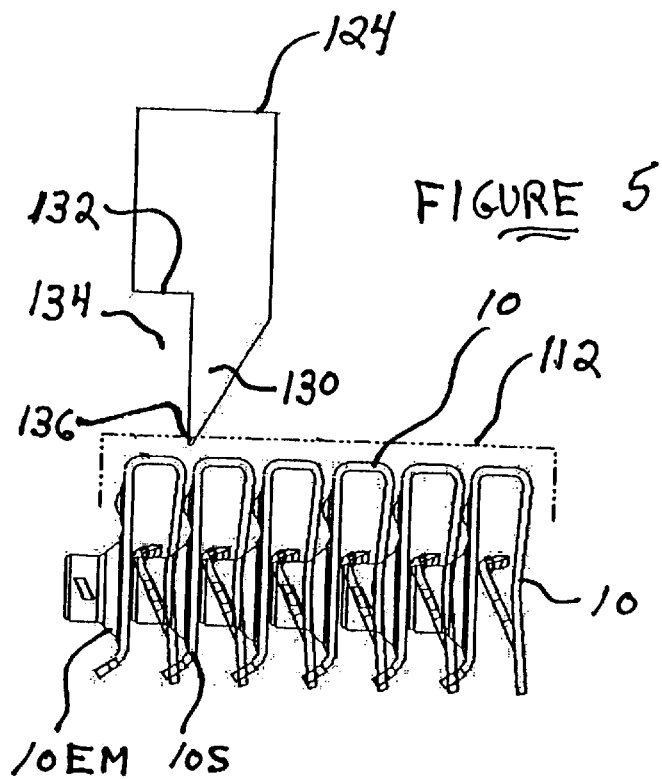
FIGS. 5–8 are schematic views showing how the wedge-shaped driver component of the pneumatically-operable U-nut type fastener installation tool shown in FIGS. 1 and 2 is used to sequentially engage an endmost one of the nested, stacked, or collated U-nut fasteners, separate the endmost one of the fasteners from the other fasteners remaining within the stacked, nested, or collated strip of fasteners, and drive the separated fastener so as to effectively mount the same upon an edge portion of a support plate or panel.
Figure 6:
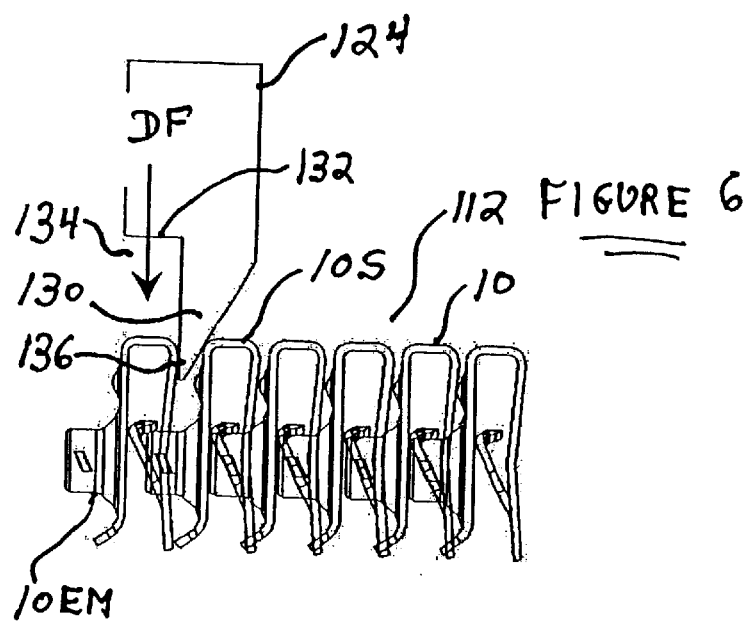

More particularly, as seen in FIG. 5, when a U-nut fastener dispensing and mounting operation or cycle is to be initiated or commenced, the tool 110 is positioned near the edge portion of the support plate or panel 120 upon which a fastener 10 is to be installed. At this time, the pneumatically driven member or component 124 of the tool 110 is initially disposed above the endmost fastener 10EM of the collated strip of fasteners 112 and the second or next fastener 10S of the collated strip of fasteners 112 such that the distal or pointed end 136 of the dependent or downwardly extending or projecting wedge-shaped portion 130 is disposed directly above the space defined between the two fasteners 10EM,10S. Consequently, when an initial driving force is impressed upon the pneumatically driven member or component 124 as schematically illustrated by means of the arrow DF shown in FIG. 6, the pneumatically driven member or component is moved downwardly whereby the pointed end 136 of the wedge-shaped portion 130 is effectively inserted into the space defined between the endmost and second-position fasteners 10EM and 10S and accordingly, initial separation of the endmost fastener 10EM from the remaining fasteners of the collated strip 112 of fasteners 10 is begun.

Figure 7:
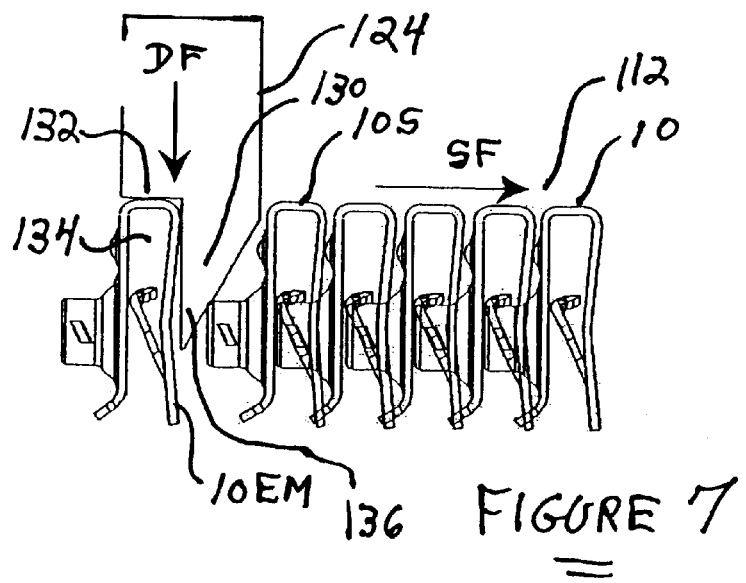

When the driving force DF continues to be impressed upon the pneumatically driven member or component 124 as illustrated in FIG. 7, the wedge-shaped portion 130 in effect becomes fully inserted between the endmost fastener 10EM and the second-position fastener 10S such that separation of the endmost fastener 10EM from the second position fastener 10S, and also with respect to or from the remaining fasteners 10 comprising the collated strip of fasteners 112, is completed. It is to be appreciated that in view of the fact that the left end of the endmost fastener 10EM is in effect fixedly disposed in surface contact or engagement with the inner surface portion of the magazine door 118, separation of the endmost fastener 10EM from the second-position fastener 10S and the collated strip of fasteners 112 can only be achieved as a result of the collated strip of fasteners 112 effectively moving to the right as viewed in FIG. 7. More particularly, it is remembered that the collated strip of fasteners 112 is biased toward the left as viewed in FIG. 7 by means of the aforenoted biasing spring member, not shown, disposed within the fastener magazine 114. Consequently, as a result of the insertion of the wedge-shaped portion 130 of the pneumatically-driven member or component 124 between the endmost fastener 10EM and the second-position fastener 10S, and the leftward fixation of the endmost fastener 10EM upon the magazine door 118, the collated strip of fasteners 112 is forced toward the right as viewed in FIG. 7 against the biasing force of the biasing spring member, not shown, disposed within the fastener magazine 114 so as to in fact achieve separation of the endmost fastener 10EM. It is additionally noted that in accordance with the unique system of the present invention, and the arrangement of the components parts thereof, the separation force, as denoted by the arrow SF, or the direction in which the separation force SF is acting or being transmitted, is substantially perpendicular to the driving force DF or the direction in which the driving force DF is acting or being transmitted.

It is also to be noted at this stage of the fastener installation process that the endmost fastener 10EM is now also fully seated within the socket portion 134 of the pneumatically driven member or component 124 so as to now be ready to be effectively dispensed from the tool magazine 114 and mounted upon an edge portion of the support plate or panel 120. Accordingly, with the driving force DF continuing to be applied to the driven member or component 124, the driven member or component 124 continues to move downwardly which now forces the separated endmost fastener 10EM downwardly and is able to be mounted upon the support plate or panel 120. The support plate or panel 120 is conventionally provided with an aperture 138 into which the annular hoop or retainer ring 18 is disposed and seated thereby seating or fixing the U-nut fastener 10EM upon the support plate or panel 120. Upon upward retraction of the driven member or component 124 in accordance with conventional pneumatic tool cycling, the collated strip 112 is moved leftwardly under the biasing influence of the magazine biasing spring, not shown, whereby a new endmost fastener 10EM is now disposed at the dispensing position or station with the magazine 114 in preparation for a dispensing and mounting operation.

Figure 9:
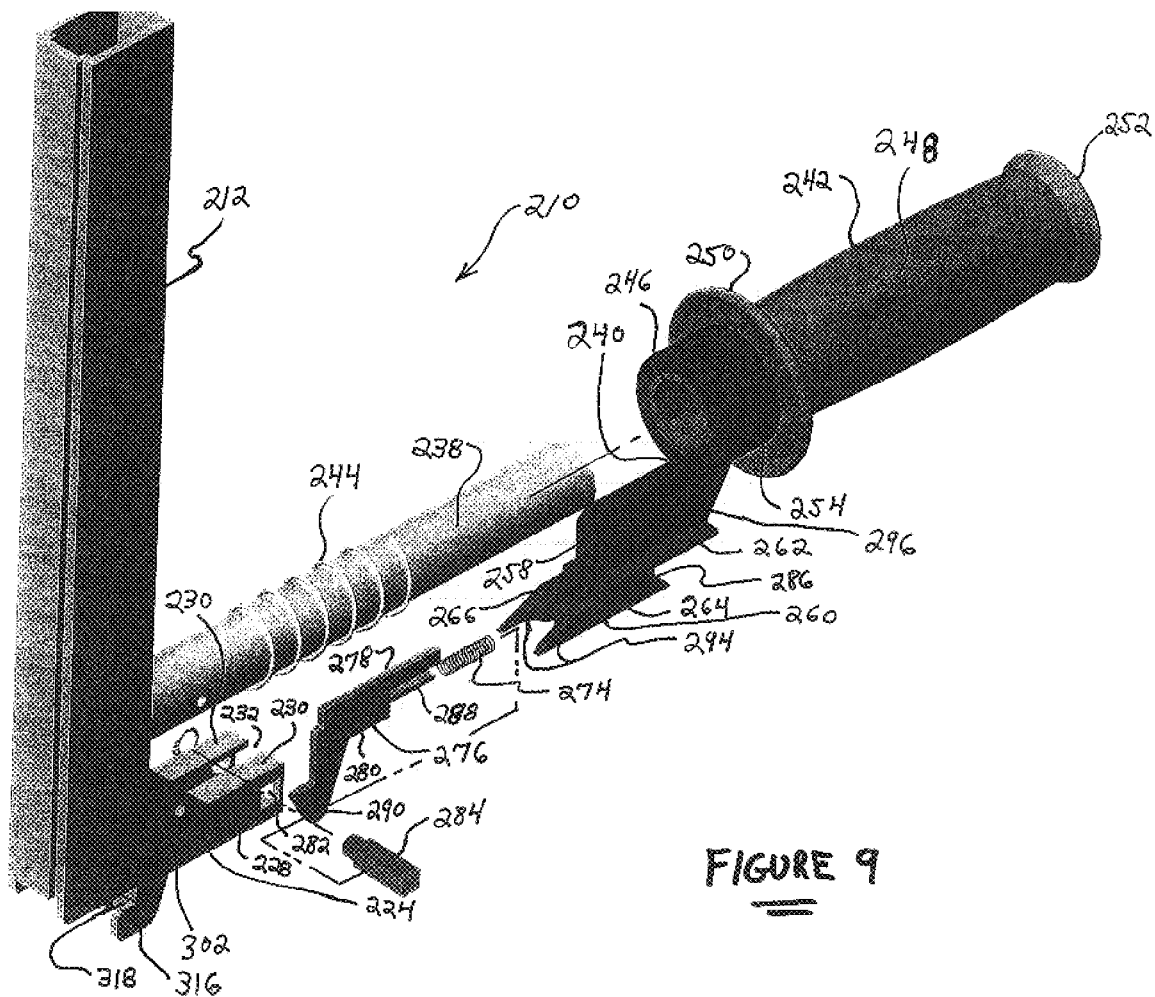
FIG. 9 is an exploded, perspective view showing a portion of the component parts of a new and improved manually-operable U-nut type fastener installation tool constructed in accordance with the principles and teachings of the present invention.
Figure 17:
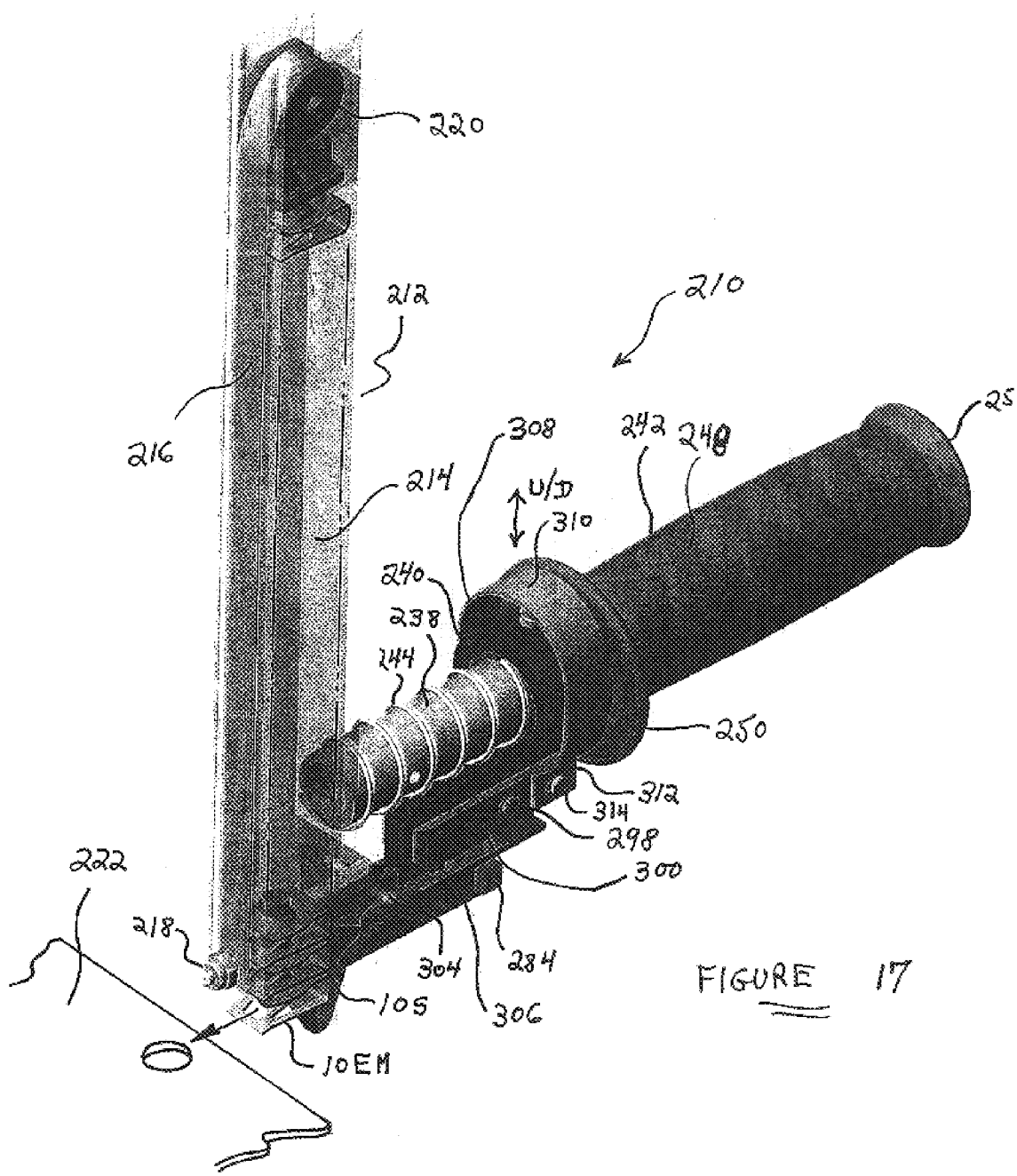
FIG. 17 is a perspective view of the new and improved installation tool as shown in FIG. 9 showing, however, the tool as assembled and upon commencement of a U-nut fastener installation operation.
Figure 18:
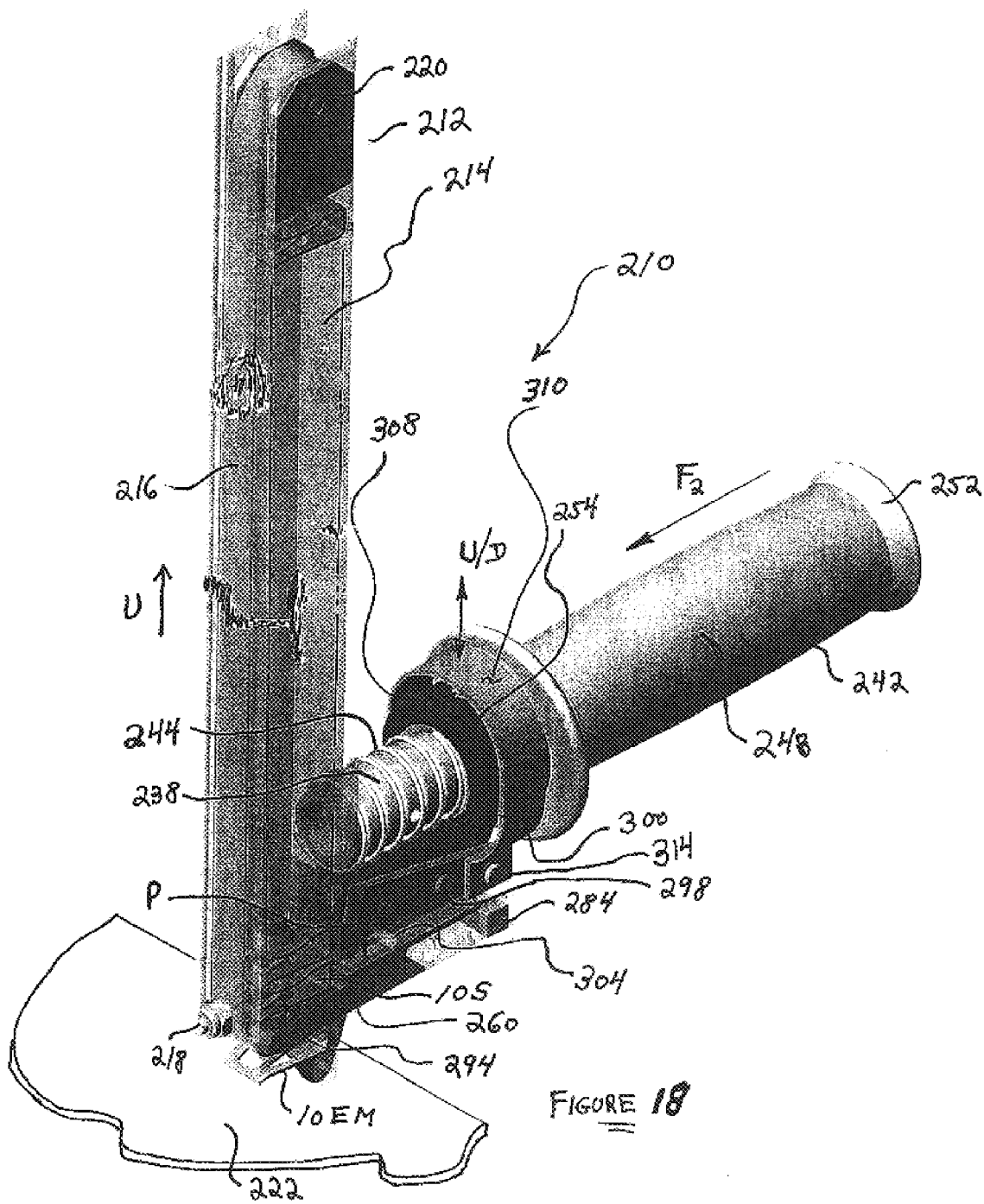
FIG. 18 is a perspective view of the new and improved installation tool as shown in FIG. 16 showing the installation of the lowermost U-nut fastener upon a support panel and the separation of such fastener from the nested stack of fasteners disposed within the tool magazine.

With reference now being made to FIGS. 9,17, and 18, a new and improved manually operable U-nut type fastener installation tool constructed in accordance with the principles and teachings of the present invention is disclosed and is generally indicated by the reference character 210. While the manually-operable U-nut fastener installation tool 210 comprises some operative components which are not present, or are different from those present, within the pneumatically-operable U-nut fastener installation tool 110, the basic mode of operation of the two installation tools 110,210 is essentially the same. Accordingly, the manually-operable U-nut type fastener installation tool 210 is seen to comprise an upstanding magazine 212 within which a nested or collated stack of U-nut fasteners 214 is adapted to be disposed. The upper end of the magazine 212 is adapted to be closed, while the lower end of the magazine is open so as to permit the nested stack of U-nut fasteners 214 to be inserted or loaded through the bottom of the magazine 212. A constant-force spring 216 is disposed within the magazine 212 and has a lower end portion thereof fixed upon a lower end wall portion of the magazine 212 by means of a suitable bolt fastener 218, while the opposite end of the spring 216 is coiled around a follower mechanism 220. In this manner, when the nested stack of U-nut fasteners 214 is inserted or loaded through the bottom or lower end of the magazine 212, the upper end of the nested stack of U-nut fasteners 214 encounters the spring follower mechanism 220 so as to force the same upwardly and thereby uncoil the spring 216. Accordingly, when the nested stack of U-nut fasteners 214 is disposed within the magazine 212, the constant force spring 216 exerts a force or biases the nested stack of U-nut fasteners in the downward direction toward the open lower end of the magazine 212 such that a lowermost or endmost one of the U-nut fasteners 10EM is disposed in a readied position so as to be dispensed and mounted onto an edge portion of a support panel 222.

In order to support the nested stack of U-nut fasteners 214 within the magazine 212, and with additional reference being made to FIGS. 14 and 15, the magazine 212 has a structural base 224 integrally formed at the lower end thereof, and as can be appreciated from FIGS. 14 and 15, it is seen that the structural base 224 has a configuration which is substantially that of a hollow rectangular parallelepiped. Accordingly, it is seen that the structural base 224 comprises a hollow central or axial portion which is defined by means of a floor member 226, a pair of oppositely disposed upstanding side walls 228,228, and a pair of flange members 230,230 projecting inwardly from the upper ends of the oppositely disposed side walls 228,228 such that a slot 232 is defined between the inner ends of the flange members 230,230. It is noted from FIG. 14 that the axial length of floor member 226 is less than that of the structural base 224 such that a space 234 is defined in effect within the forward end of structural base 224 between the forward end of the floor member 226 and the magazine 212 for a purpose to be described shortly hereinafter. In addition, the magazine 212 further comprises a tubular stud member 236 integrally mounted thereon at an elevational level just above the structural base 224 and upon which a fastener separator-handle assembly support bar 238 is fixedly mounted. The fastener separator-handle assembly comprises a U-nut fastener separator 240 and an operator handle 242 fixedly mounted upon the fastener separator 240, and the separator-handle assembly 240–242 is adapted to be reciprocably mounted upon the support bar 238. A coil spring 244 is disposed upon the support bar 238 with opposite ends of the spring 244 interposed between the magazine 212 and the fastener separator 240 so as to normally axially bias the fastener separator-handle assembly 240–242 away from the magazine 212 and to in effect an inoperative position at which the separator 240 is not able to dispense and mount any of the fasteners 10 upon the support plate or panel 222.

With reference now being particularly made to FIGS. 9,11–13, and 16, the specific structure of the fastener separator-handle assembly 240–242 will be described. More particularly, as best disclosed within FIG. 16, it is seen that the handle 242 comprises an inner tubular liner 246, which may be fabricated from a suitable metal, such as, for example, steel, and an outer tubular handlegrip 248 which may be fabricated from a suitable rubber and which is adapted to be fixedly mounted upon the tubular liner 246 by means of, for example, a friction fit or the like. An annular flanged portion 250 is defined upon the forward end of the handlegrip 248, and it is seen that the forward end of the tubular liner 246 projects outwardly from and forwardly of the forward open end of the handlegrip 248 while the rear portion of the tubular liner 246 extends internally of the handlegrip 248 until it encounters the rear closed end or wall 252 of the handlegrip 248. As best seen in FIGS. 9 and 12, the U-nut separator 240 comprises an upper tubular or annular ring member 254 which defines a through-bore 256 which has an internal diameter which is dimensioned so as to define, for example, a friction fit with respect to the external diameter of the tubular liner 246 upon which the ring member 254 of the separator 240 is disposed. The rearward end of the separator ring member 254 also abuts the annular flanged portion 250 of the handlegrip 248. In this manner, when the fastener separator-handle assembly 240–242 is mounted upon the magazine support bar 238, the tubular liner 246 of the separator-handle assembly 240–242 is able to freely reciprocate upon and with respect to the magazine support bar 238 such that the separator 240 can be disposed at a rearward inoperative position remote from the fastener magazine 212, or at a forward operative position at which the separator 240 can be used to perform a fastener separation and mounting operation as will be described more in detail hereinafter.

The fastener separator 240 further comprises a vertical web portion 258 which is integrally connected to the bottom portion of the annular ring member 254, and the web portion 258 is disposed atop a base portion 260. In view of the fact that the base portion 260 has a greater width than that of the web portion 258, a pair of lateral shoulder portions 262,262 are formed upon opposite sides of the web portion 258. The separator 240 also includes a bottom surface 264. It is therefore to be appreciated, as may best be seen from FIG. 9, that when the separator-handle assembly 240–242 is mounted upon the magazine 212, and more particularly, when the separator-handle assembly 240–242 is mounted upon the magazine support bar 238, the base portion 260 of the separator 240 will be disposed within the structural base 228 of the magazine 212. The bottom surface 264 of the separator 240 will be movably disposed upon the floor member 226 of the structural base 228, the shoulder portions 262, 262 of the separator 240 will engage the undersurface portions of the overhanging inwardly projecting flanges 230,230 of the structural base 228, and the upstanding web portion 258 of the separator 240 will project upwardly through the slot 232 defined between the inner edge portions of the magazine flanges 230,230.

The separator 240 is further provided with an axially or longitudinally extending slot 266 formed within the base portion 260 as well as the lower portion of the web member 258 whereby the base portion 260 is effectively divided into two half-sections 260L,260R. Inner side walls 268,268 of each base half-section 260L,260R are provided with arcuate or concave recesses 270,270 which together in effect form a bore 272. The bore 272 is adapted to house a catch spring 274 which is operatively associated with a reciprocating catch assembly 276, and the catch assembly 276 is adapted to be inserted within the slot 266 defined within the separator 240. Accordingly, an upper surface 278 of the catch assembly 276 will slidably abut the upper wall portion of the web member 258 which defines the upper extent of the slot 266, and a bottom surface 280 of the catch assembly 276 is slidably supported upon the floor member 226 of the magazine structural base 224. The opposite side walls 228,228 of the magazine structural base 224 are respectively provided with apertures 282,282 and a stop pin 284 is adapted to be transversely inserted through the apertures 282,282.

A rear section of the separator base portion 260 includes a recessed region 286 within which the stop pin 284 is disposed when the separator 240 is mounted within the magazine structural base 224. The stop pin 284 serves as a stop so as to retain the separator-handle assembly 240–242 mounted upon the magazine structural base 224 when the separator-handle assembly 240–242 is biased to its rearward inoperative position by means of the coil spring 244 as may be appreciated from FIG. 17. The catch assembly 276 further comprises an axially extending post 288 upon which the catch spring 274 is to be mounted, and accordingly, it is appreciated that the catch spring 274 is interposed between the catch assembly 276 and the stop pin 284 as may best be appreciated from FIG. 10. In this manner, the catch assembly 276 is normally biased to a forward position, as indicated by the arrow $F_1$, at which a dependent stepped catch member 290 of the catch assembly 276, which is inserted within the space 234 defined within the magazine structural base 224, is disposed beneath the nested stack of U-nut fasteners 214 as is also best seen in FIG. 10 so as to support the nested stack of U-nut fasteners 214 within the magazine 212. It is to be further appreciated that when the nested stack of U-nut fasteners 214 is being inserted into the magazine 212, the individual fasteners 10 will encounter the forwardmost beveled edge portion 292 of the stepped catch member 290 so as to bias or force the catch assembly 276 rearwardly against the forward biasing force of the catch spring 274 and thereby permit or facilitate the loading of the nested stack of fasteners 214 into the magazine 212. When the entire stack of fasteners 214 is loaded into the magazine 212, then the catch assembly 276 will be biased forwardly by the catch spring 274 whereby the stepped catch member 290 will in fact be disposed beneath the stack of fasteners 214 so as to support the same within the magazine 212.

In order to actually install the U-nut fasteners, and as was the case with the pneumatically operated tool 110 disclosed within FIGS. 3–8, the separator 240 of the manually-operable tool 210 is similarly provided with a wedge-shaped portion comprising a pair of wedge-shaped members 294, 294 which are respectively formed upon the forward end portions of each one of the base half-sections 260L,260R. As can be appreciated from FIGS. 17 and 18, when the wedge-shaped members 294,294 are inserted into the space defined between the endmost fastener 10EM and the second lowermost fastener 10S, the wedge-shaped members 294,294 separate the lowermost or endmost fastener 10EM from the second lowermost fastener 10S whereby the lowermost or endmost fastener 10EM can be mounted upon the support plate or panel 222. As was the case with the pneumatically-operable tool 110, when the wedge-shaped members 294, 294 actually separate the lowermost or endmost fastener 10EM from the remaining fasteners 10 of the stack of fasteners 214, the stack of fasteners 214 is forced upwardly against the bias of the spring 216 as denoted by the arrow U.

In connection with the separation of the lowermost or endmost fastener 10EM from the second lowermost fastener 10S and the remaining fasteners 10 of the nested stack of fasteners 214, it is necessary that the separator-handle assembly 240–242 be retained at its forward position against the biasing force of the coil spring 244, when the separator-handle assembly 240–242 is moved in the direction of the arrow $F_2$ as seen in FIG. 18, at which position the wedge-shaped members 294,294 disconnect or separate the endmost fastener 10EM from the nested stack of fasteners 214 and also support the nested stack of fasteners 214. The reason for this is that if the separator-handle assembly 240–242 is not maintained at its forward position until the lowermost or endmost fastener 10EM is fully installed upon the support plate or panel 222 and the installation tool 210 removed or disengaged from the support plate or panel 222, then upon retraction of the separator-handle assembly 240–242 to its rearward position and prior to the removal or disengagement of the installation tool 210 from the support plate or panel 222, the downward biasing force of the spring 216 and the weight of the nested stack of fasteners 214 will in effect cause re-engagement of the second lowermost fastener 10S, and in effect the entire stack of fasteners 214, with the lowermost or endmost fastener 10EM now fully mounted or inserted upon the support plate or panel 222. Accordingly, the installation tool 210, through means of its magazine 212, and the re-engagement of the fasteners 10, will now be effectively locked upon the support plate or panel 222.

Consequently, in order to prevent the foregoing from occurring, the installation tool 210 is further provided with a latching system which effectively retains the separator-handle assembly 240–242 at its forward position at which the lowermost or endmost fastener 10EM can be dispensed or separated and mounted upon the support plate or panel 22, and the separator-handle assembly 240–242 can be maintained at such position until the installation tool 210 has been completely removed or disengaged from the installed endmost fastener 10EM and the support plate or panel 222. More particularly, the web member 258 of the separator 240 has a transversely disposed throughbore 296 defined therein, and a trunnion 298 is adapted to be mounted within the bore 296. A pair of latch members 300, only one of which is shown in FIGS. 17 and 18, are pivotally mounted upon opposite ends of the trunnion 298, and a pair of triangularly shaped brackets 302 are integrally connected to lower side portions of the magazine 212 and to upper portions of the structural base 224. A pair of laterally outwardly extending latch pins 304,304 are mounted upon the brackets 302,302 as best seen in FIGS. 10,14,17, and 18, and it is additionally seen that the forward ends of the latch members 300,300 have tapered downwardly projecting portions 306,306 as best seen in FIG. 17. It can thus be appreciated from FIG. 18 that when the separator-handle assembly 240–242 is moved forwardly as denoted by the arrow $F_2$, the latch projections 306,306 will encounter the latch pins 304,304, the latch members 300,300 will be forced to pivot on the trunnions 298 as denoted by the arrow P in FIG. 18, and the latch projections of the latch members 300,300 will in effect be latched upon the latch pins 304,304 in a snap-fitted manner whereby the separator-handle assembly 240–242 will be retained at its forward position.

In order to assist in the achievement of the aforenoted latching operation, as well as to achieve the release of the latching mechanism so as to in fact permit the separator-handle assembly 240–242 to be retracted or moved back to its original inoperative position under the influence of the coil spring 244, a latch spring 308 is fixedly mounted upon the upper central portion of the annular ring member 254 of the separator 240. A substantially horseshoe-shaped latch release member 310 has its upper central portion disposed in contact with the latch spring 308 while lower opposite free end portions 312,312 of the latch release member 310 are fixedly secured upon rear portions of the latch members 300,300 by means of suitable fasteners 314,314. Accordingly, it can be appreciated, as denoted by the arrow U/D shown in FIGS. 17 and 18, that the latch spring 308 will normally bias the latch release member 310 upwardly whereby the latch members 300,300 will be biased in their pivotally downward positions so as to engage the latch pins 304,304 of the magazine-structural base assembly 212–224, whereas when the latch release member 310 is depressed downwardly by means of an operator, the latch members 300,300 will be pivoted upwardly so as to permit release of the separator-handle assembly 240–242 from the latch pins 304,304 so as to permit the separator-handle assembly 240–242 to be moved rearwardly under the biasing influence of the coil spring 244.

It is to be lastly appreciated that the magazine 212, the magazine structural base portion 224 and the fastener separator 240 further comprise particular structure which enables and facilitates the installation of the individual fasteners 10 upon the edge portion of the support plate or panel 222. Specifically, it is seen, for example, that the lower surface of the structural base portion 224 has a pair of dependent legs 316,316 integrally formed therewith but spaced below the lower surface of the structural base portion 224 so as to define a guide slot 318. Slot 318 can accommodate the insertion of the edge portion of the support plate or panel 222 therewithin and serves to relatively guide the installation tool 210 into proper engagement with the edge portion of the support plate or panel 222. At the same time, it is further appreciated that the lowermost or endmost U-nut fastener 10EM is elevationally aligned with the guide slot 318 in view of the fact that the lowermost or endmost fastener 10EM is supported upon the stepped catch member 290 as shown, for example, in FIG. 10 whereby, again, seating or mounting of the lowermost or endmost fastener 10EM upon the support plate or panel 222 is facilitated. In addition, in order to forcefully seat the lowermost or endmost fastener 10EM upon the support plate or panel 222 immediately after the separator 240 has effectively separated the lowermost or endmost fastener 10EM from the nested stack of fasteners 214 disposed within the magazine 212, the separator 240 is provided with an upstanding ridge portion 320 which is defined at the forward portions of the web member 258 and shoulder portions 262,262.

Figure 10:
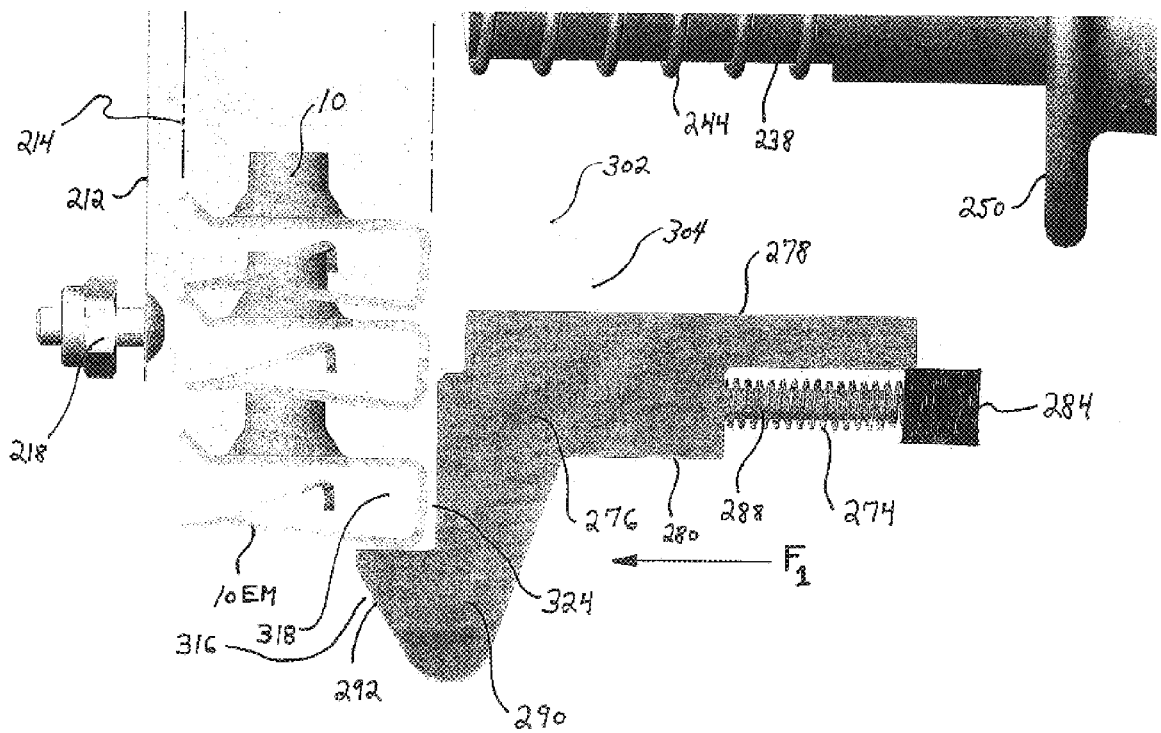
FIG. 10 is a partial side elevational view of the new and improved manually-operable installation tool illustrated in FIG. 9 showing a nested stack of U-nut fasteners as supported within the tool magazine by means of the spring-biased catch mechanism.
Figure 11:
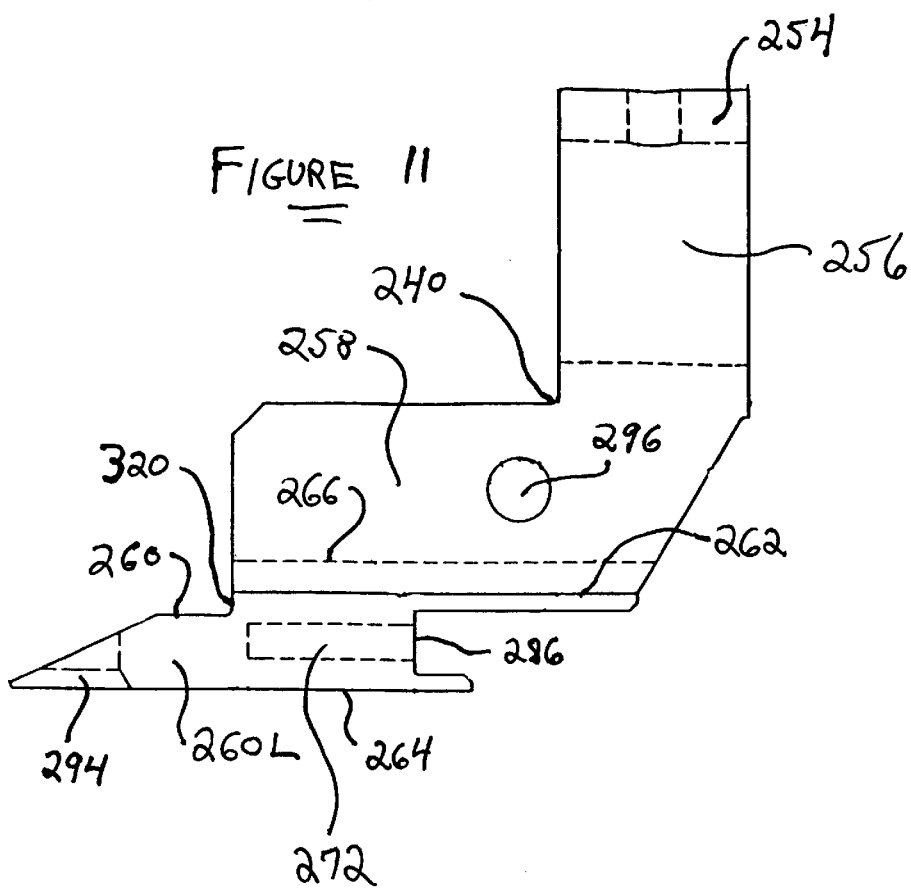
FIG. 11 is a side elevational view of the separator component of the new and improved installation tool shown in FIG. 9.
Figure 16:
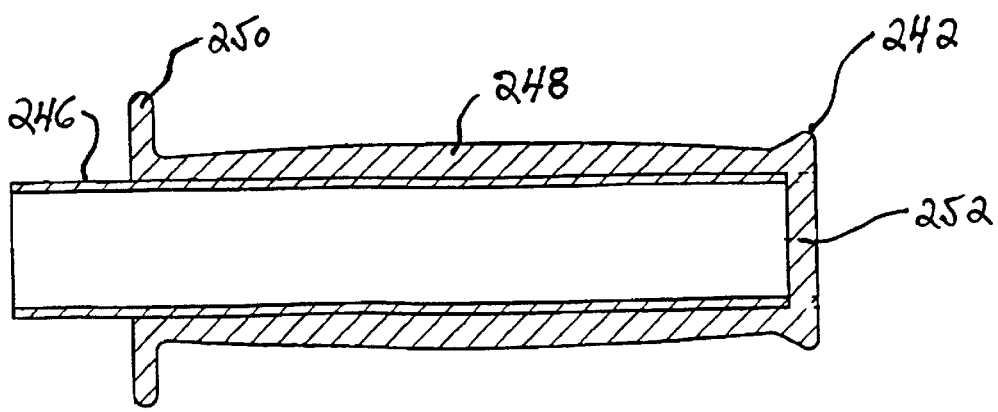
FIG. 16 is a cross-sectional view of the operator handle of the new and improved installation tool as shown in FIG. 9.

The rear wall of the magazine 212 is provided with a dependent lip portion 322 as best seen in FIG. 14, and magazine structural base portion 224 is provided with a pair of oppositely disposed, inwardly projecting wall members 324,324 which are vertically aligned with the rear wall and lip portion 322 of the magazine 212 and which are disposed in effect in abutment with or just immediately rearwardly of the lowermost or endmost fastener 10EM as can best be appreciated from FIG. 10. Consequently, when the separator-handle assembly 240–242 is moved forwardly in the direction of arrow $F_2$, and once the separator wedge members 294,294 have separated the lowermost or endmost fastener 10EM from the nested stack of fasteners 214, ridge member or portion 320 of the separator 240 will encounter the dependent lip portion 322 of the magazine rear wall and effectively force the magazine 212 forwardly. In addition, since the wall portions 324,324 are integral with the magazine 212, the wall portions 324,324 will in turn force the lowermost or endmost fastener 10EM forwardly and onto the edge portion of the support plate or panel 222.

Thus, it may be seen that in accordance with the teachings and principles of the present invention, a new and improved U-nut type fastener installation tool has been developed wherein the fasteners are arranged within a vertically or horizontally nested or stacked array or magazine within the tool, and wherein further, the tool can easily and readily separate such fasteners and install the same upon edge portions of the support plates or panels. More particularly, the tool magazine includes a biasing spring for biasing the stacked or collated strip of fasteners toward a dispensing position, and the tool further comprises a manually or pneumatically driven wedge member wherein the endmost fastener is able to be separated from the collated strip of fasteners and forced onto an edge portion of a support plate or panel.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America is:

1. An installation tool for serially installing individual fasteners upon a support member, comprising:

a magazine for housing a plurality of fasteners, said fasteners being effectively locked together to form a nested array for insertion into said magazine, each fastener being adapted and configured to mechanically lock itself to an adjacent fastener;

a driving assembly; and driven means operatively connected to said driving assembly for movement in a first direction, so as to cause an endmost one of the plurality of nested fasteners to be driven in said first direction in order to mount the endmost one of the plurality of nested fasteners upon the support member, while simultaneously causing separation of remaining ones of the plurality of nested fasteners, from the endmost one of the plurality of nested fasteners, in a second direction which is substantially perpendicular to said first direction such that the endmost one of the plurality of nested fasteners, now separated from the remaining ones of the plurality of nested fasteners, is able to be mounted upon the support member.

2. The installation tool as set forth in claim 1, wherein:

said driving assembly comprises a pneumatically operable driving assembly whereby said tool comprises a pneumatically operable tool.

3. The installation tool as set forth in claim 1, wherein:

said driven means comprises a wedge-shaped member comprising a pointed end which is adapted to be inserted into a space defined between the endmost one of the plurality of nested fasteners and the next adjacent one of the plurality of nested fasteners so as to separate the endmost one of the plurality of nested fasteners from the remaining ones of the plurality of nested fasteners.

4. The installation tool as set forth in claim 3, wherein:

said driven wedge-shaped member has a stepped configuration comprising a socket portion for seating the endmost one of the plurality of nested fasteners in preparation for mounting of the endmost one of the plurality of nested fasteners upon the support member.

5. The installation tool as set forth in claim 1, wherein:

said magazine and said driving assembly are disposed substantially perpendicular with respect to each other.

6. The installation tool as set forth in claim 1, further comprising:

a handle integrally interconnected between said magazine and said driving assembly.

7. The installation tool as set forth in claim 1, further comprising:

a spring mechanism disposed within said magazine for generating a biasing force for biasing the plurality of nested fasteners toward a dispensing position and wherein the remaining ones of the plurality of nested fasteners are moved in said second direction against said biasing force of said spring mechanism when the remaining ones of the plurality of nested fasteners are separated from the endmost one of the plurality of nested fasteners.

8. The installation tool as set forth in claim 1, wherein:

said driving assembly comprises a manually operable driving assembly whereby said tool comprises a manually operable tool.

9. The installation tool as set forth in claim 8, wherein:

said driving assembly comprises a manually manipulable handle; and said driven means comprises a separator component fixedly mounted upon said handle.

10. The installation tool as set forth in claim 9, further comprising:

a support rod fixedly mounted upon said magazine for reciprocatingly supporting said handle and said separator component for movement between an inoperative position remote from said magazine and an operative position adjacent said magazine at which said separator component separates the remaining ones of the plurality of nested fasteners from the endmost one of the plurality of nested fasteners.

11. The installation tool as set forth in claim 8, further comprising:

a catch mechanism reciprocally mounted upon said magazine between a first position remote from said magazine so as to permit the plurality of nested fasteners to be loaded into said magazine, and a second position adjacent to said magazine for supporting the plurality of nested fasteners within said magazine.

12. The installation tool as set forth in claim 10, further comprising:

at least one latch pin mounted upon said magazine; and at least one latch member movably mounted upon said separator component between a first position at which said at least one latch member is engaged with said at least one latch pin whereby said separator component is maintained at said operative position adjacent to said magazine such that said separator component can maintain the remaining fasteners separated from the endmost one of the fasteners, and a second position at which said at least one latch member is disengaged from said at least one latch pin so as to permit said separator component to be moved back to said inoperative position.

13. The installation tool as set forth in claim 9, wherein:

said separator component comprises an upstanding ridge portion for engaging a portion of said magazine for causing said magazine to engage the endmost one of the plurality of nested fasteners so as to force the endmost one of the plurality of nested fasteners to be mounted upon the support member when said separator component is moved in said first direction.

14. The installation tool as set forth in claim 9, wherein:

said separator component comprises an upstanding ridge portion for engaging a portion of said magazine for causing said magazine to engage the endmost one of the plurality of nested fasteners so as to force the endmost one of the plurality of nested fasteners to be mounted upon the support member when said separator component is moved in said first direction.

15. An installation tool as defined in claim 1, further comprising a catch mechanism reciprocally mounted upon said magazine between a first position remote from said magazine so as to permit said plurality of nested fasteners to be loaded into said magazine, and a second position adjacent to said magazine for supporting said plurality of nested fasteners within said magazine, wherein said catch mechanism is resiliently biased towards said second position.

16. An installation tool for serially installing individual fasteners upon a support member, comprising:

a magazine;

a plurality of fasteners being effectively locked together to form a nested array for insertion into said magazine, each fastener being adapted and configured to mechanically lock itself to an adjacent fastener;

a driving assembly; and driven means movably disposed within said driving assembly for movement in a first direction, so as to engage an endmost one of said plurality of nested fasteners and thereby drive said endmost one of said plurality of nested fasteners in said first direction in order to mount said endmost one of said plurality of nested fasteners upon the support member, while simultaneously causing separation of remaining ones of said plurality of nested fasteners, from said endmost one of said plurality of nested fasteners, in a second direction which is substantially perpendicular to said first direction such that said endmost one of said plurality of nested fasteners, now separated from said remaining ones of said plurality of nested fasteners, is able to be mounted upon the support member.

17. The installation tool as set forth in claim 16, wherein:
said driving assembly comprises a pneumatically operable driving assembly whereby said tool comprises a pneumatically operable tool.

18. The installation tool as set forth in claim 16, wherein:
said driven means comprises a wedge-shaped member comprising a pointed end which is adapted to be inserted into a space defined between said endmost one of said plurality of nested fasteners and the next adjacent one of said plurality of nested fasteners so as to separate said endmost one of said plurality of nested fasteners from said remaining ones of said plurality of nested fasteners.

19. The installation tool as set forth in claim 18, wherein:
said driven wedge-shaped member has a stepped configuration comprising a socket portion for seating said endmost one of said plurality of nested fasteners in preparation for mounting of said endmost one of said plurality of nested fasteners upon the support member.

20. The installation tool as set forth in claim 16, wherein:
said magazine and said driving assembly are disposed substantially perpendicular with respect to each other.

21. The installation tool as set forth in claim 16, further comprising:
a handle integrally interconnected between said magazine and said driving assembly.

22. The installation tool as set forth in claim 16, further comprising:
a spring mechanism disposed within said magazine for generating a biasing force for biasing said plurality of nested fasteners toward a dispensing position and wherein said remaining ones of said plurality of nested fasteners are moved in said second direction against said biasing force of said spring mechanism when said remaining ones of said plurality of nested fasteners are separated from said endmost one of said plurality of nested fasteners.

23. The installation tool as set forth in claim 16, wherein:
each one of said fasteners comprises a U-nut type fastener.

24. The installation tool as set forth in claim 23, wherein:
each one of said U-nut type fasteners comprises a first lower arm member comprising a retainer ring, and a second upper arm member comprises an upstanding nut portion such that a retainer ring of an upper one of said plurality of stacked fasteners disposed within said magazine is lockingly retained upon an upstanding nut portion of a lower one of said plurality of stacked fasteners.

25. The installation tool as set forth in claim 16, wherein:
said driving assembly comprises a manually operable driving assembly whereby said tool comprises a manually operable tool.

26. The installation tool as set forth in claim 25, wherein:
said driving assembly comprises a manually manipulable handle; and
said driven means comprises a separator component fixedly mounted upon said handle.

27. The installation tool as set forth in claim 26, further comprising:
a support rod fixedly mounted upon said magazine for reciprocatingly supporting said handle and said separator component for movement between an inoperative position remote from said magazine and an operative position adjacent said magazine at which said separator component separates said remaining ones of said plurality of nested fasteners from said endmost one of said plurality of nested fasteners.

28. The installation tool as set forth in claim 25, further comprising:
a catch mechanism reciprocally mounted upon said magazine between a first position remote from said magazine so as to permit said plurality of nested fasteners to be loaded into said magazine, and a second position adjacent to said magazine for supporting said plurality of nested fasteners within said magazine.

29. The installation tool as set forth in claim 27, further comprising:
at least one latch pin mounted upon said magazine; and
at least one latch member movably mounted upon said separator component between a first position at which said at least one latch member is engaged with said at least one latch pin whereby said separator component is maintained at said operative position adjacent to said magazine such that said separator component can maintain said remaining fasteners separated from said endmost one of the fasteners, and a second position at which said at least one latch member is disengaged from said at least one latch pin so as to permit said separator component to be moved back to said inoperative position.

30. An installation tool as defined in claim 16, further comprising a catch mechanism being movable between a first position remote from said magazine so as to permit said plurality of nested fasteners to be loaded into said magazine, and a second position adjacent to said magazine for supporting said plurality of nested fasteners within said magazine, wherein said catch mechanism is resiliently biased towards said second position.

* * * * *